Figure 1:
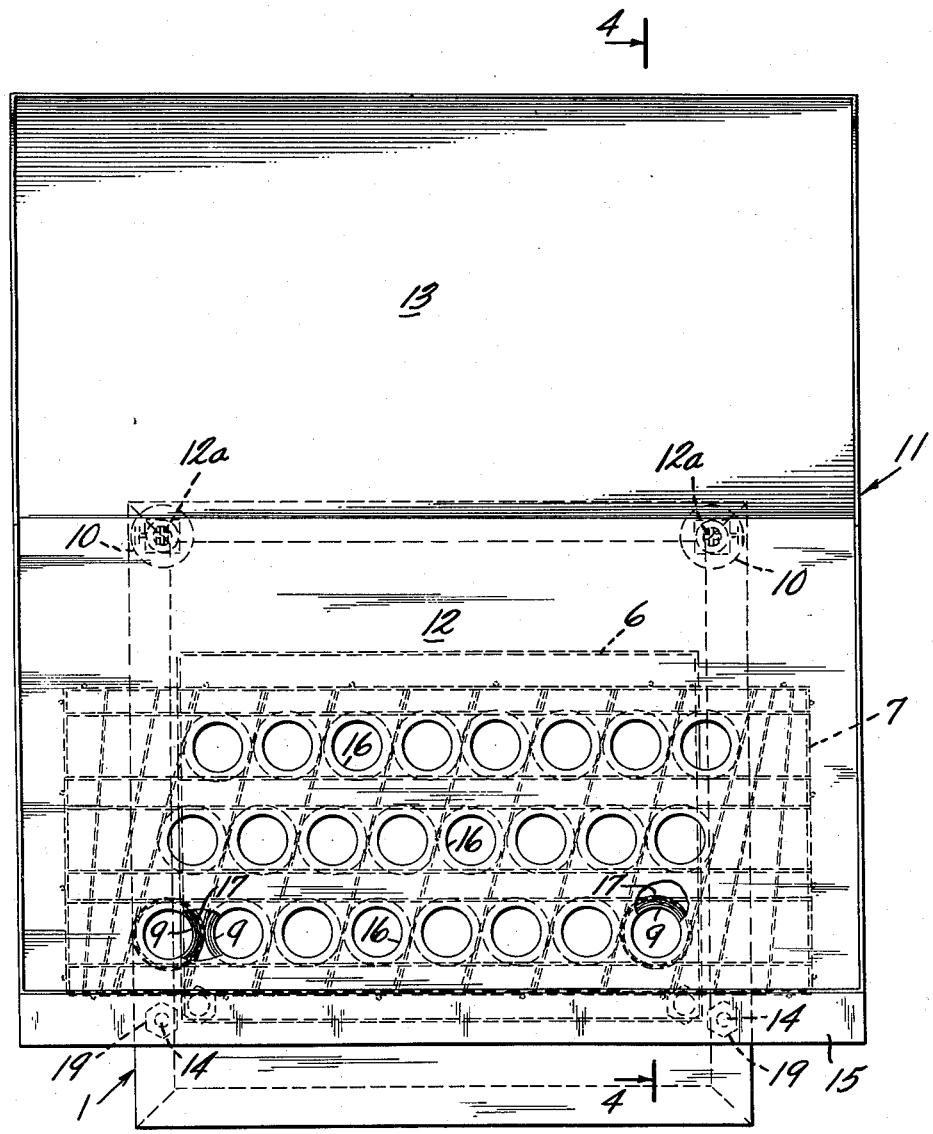

June 7, 1960 T. G. THORPE 2,939,495
APPARATUS FOR FILLING BOTTLES AND JARS
Filed July 22, 1957 4 Sheets-Sheet 3

INVENTOR
TOM THORPE
BY JEROME G. LEE
ATTORNEY

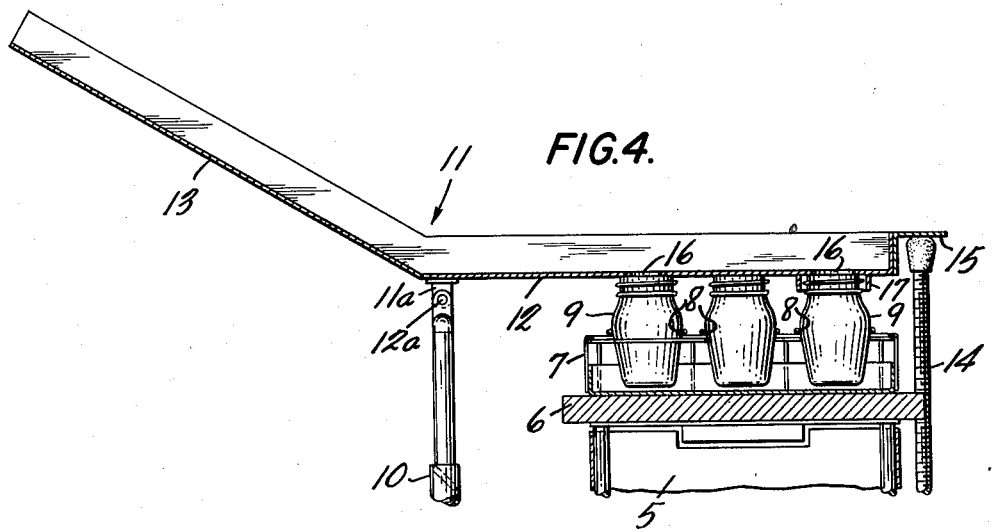
FIG.4.
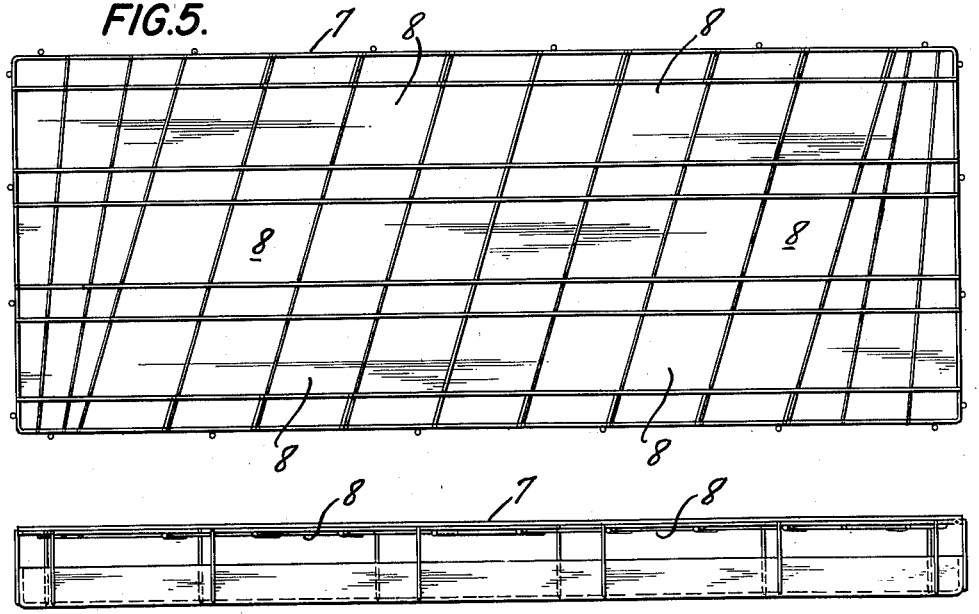
FIG.5.
FIG.6.

United States Patent Office 2,939,495
Patented June 7, 1960

2,939,495

APPARATUS FOR FILLING BOTTLES AND JARS

Thomas G. Thorpe, 60 Narcisus Ave., Hicksville, N.Y.

Filed July 22, 1957, Ser. No. 673,249

2 Claims. (Cl. 141—75)

This invention relates to an apparatus for use in filling bottles or jars with small food articles, especially fruits. It more particularly relates to apparatus for filling bottles or jars with delicate fruits such as cherries or olives.

In the present practice delicate fruit materials, cherries for example, are filled into bottles by hand. Each bottle then is filled with syrup and capped. This operation is unsanitary, exposes the fruit to bruising, and is exceedingly slow. In addition, the number of cherries per bottle varies from day to day and from worker to worker—resulting in frequent under-packing and over-packing. In order to obviate this last difficulty, occasionally the cherries are counted into the bottle one by one, but this further slows the operation.

Another practice in the art is to simultaneously drop or throw large numbers of cherries at hundreds of open bottles standing together on a table. Production is increased by this multiple filling practice but is attended by non-uniformity of packing and undesirable bruising and damage of the fruit.

Still other present practice methods include the filling of food articles, peas for example, in automatic turret machines which bring bottles one at a time to a filling station for automatic metered feeding. Although this practice reduces bruising of the fruit, is relatively uniform in pack, and is faster than counted hand filling, the increase in production is insubstantial by comparison to multiple filling, and this machinery is expensive and requires constant care to maintain sanitary standards.

Speaking generally, the present invention provides an apparatus which multiple fills large numbers of jars or bottles simultaneously with delicate fruit. Production is greatly increased without the utilization of costly or complicated machinery. Packing is uniform. The fruit is not bruised nor unduly exposed to contamination.

Briefly, this is accomplished by providing an apparatus consisting of a base support, a vibrator carried by the base support, a tray resting on the vibrator, the tray having compartments, and a table mounted at its center on the base support for limited pivotal movement which thereby divides the table into two contiguous sections. One of these sections is a solid loading section and the other is a filling section having orifices for passage of the fruit articles spaced from each other in the same relation as the compartments of the tray. The two sections of the table are pitched with respect to each other and the table is mounted with the filling section suspended above the tray for limited pivotal movement from a loading position spaced away from the tray to and from a filling position closely adjacent the tray. Means are provided to hold the tray with its compartments oriented to the orifices in the table when the tray is vibrated during filling.

Preferably, the tray holding means has at least one collar around an orifice and downwardly extending from the underside of the filling section to surround and snugly accommodate the neck of one bottle in the tray to hold the bottle and thereby the tray against creeping movement when the table is in filling position.

Figure 2:
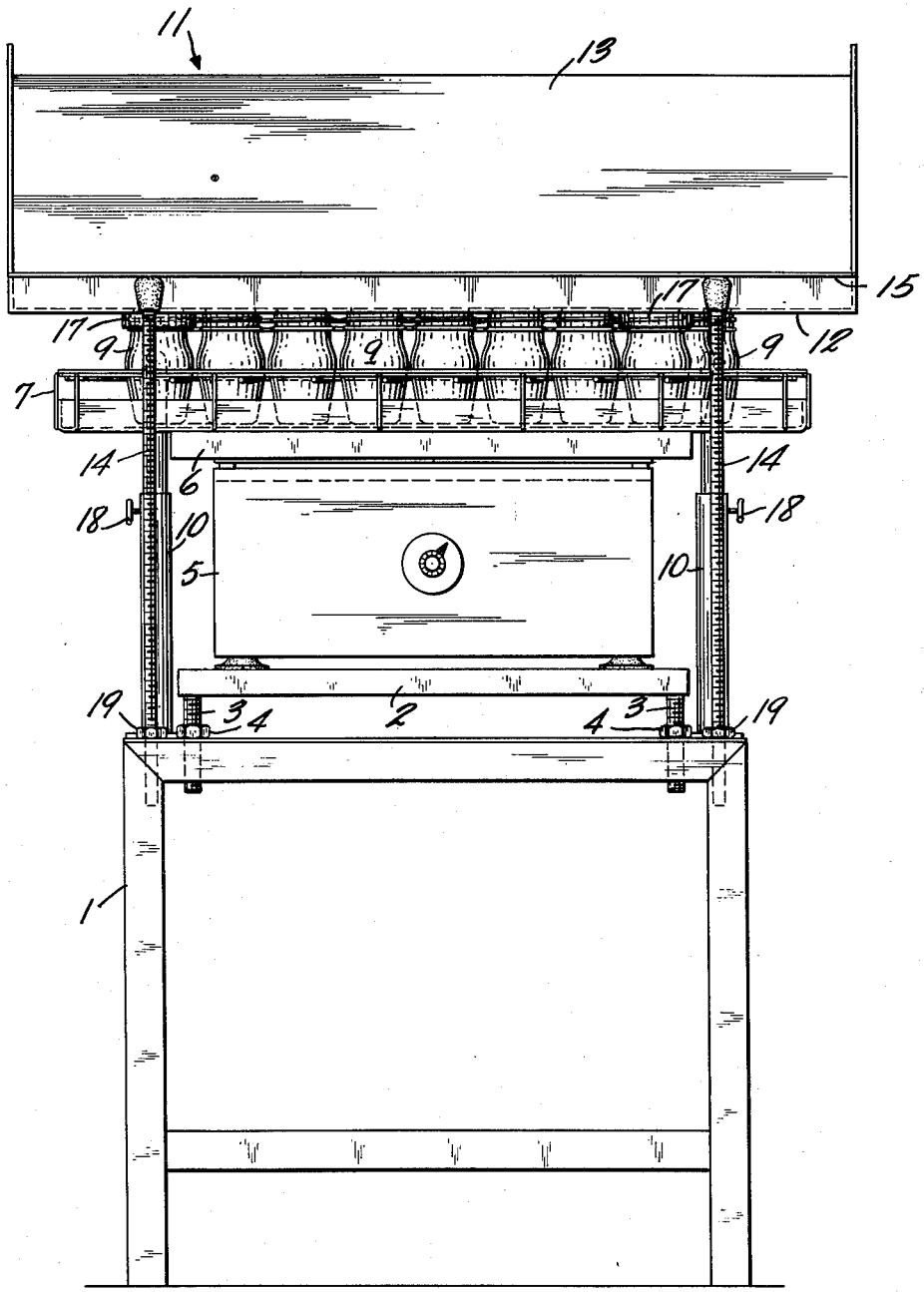
Figure 3:
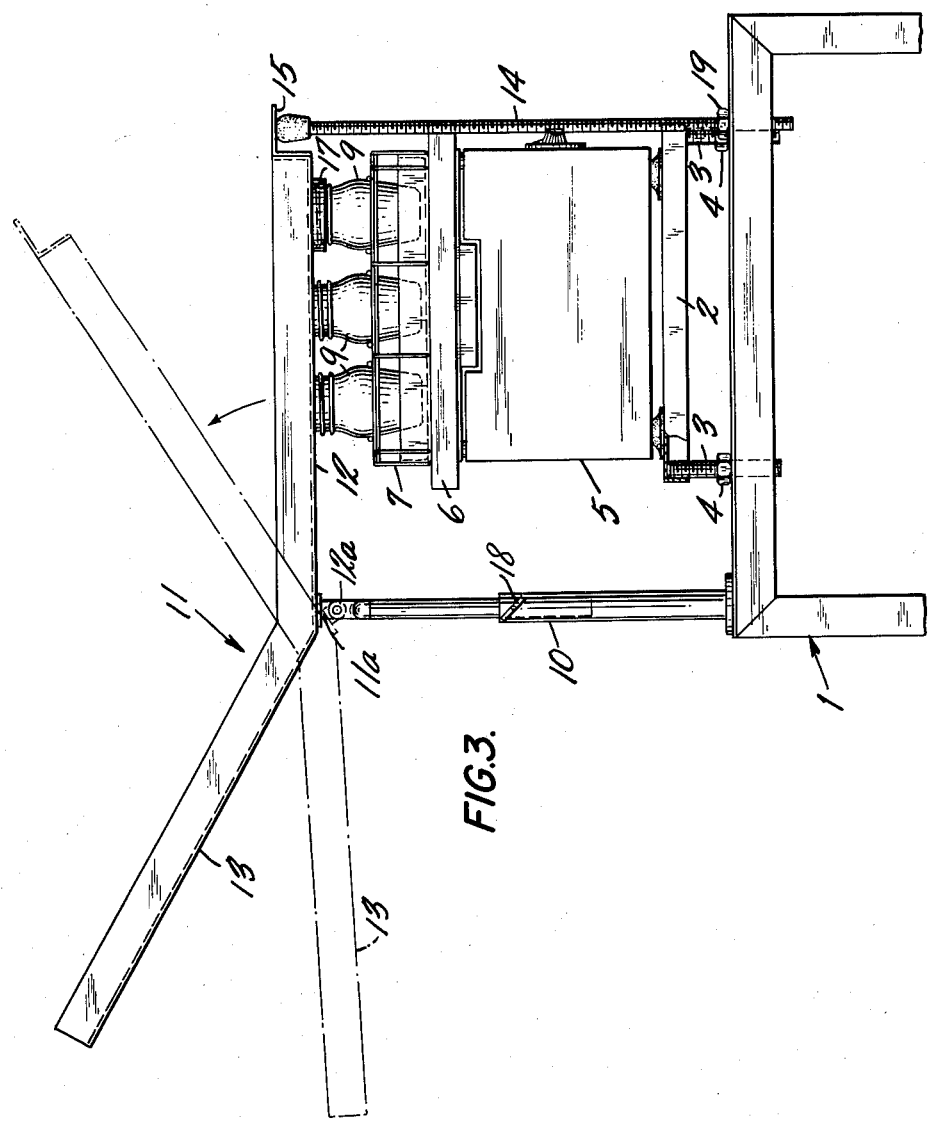

The drawings illustrate a preferred form of my invention. In these drawings Figure 1 is a top view of the entire apparatus in filling position, partly broken away to show the bottles beneath the table filling section. Figure 2 is a front elevation of the apparatus ready for filling with the jars or bottles in place. Figure 3 is a side elevation view. Figure 4 is a section along the lines 4—4 of Figure 1. Figure 5 is a top view of the tray of the apparatus. Figure 6 is a side elevation of the tray of Figure 5.

Referring now to the illustrative embodiment shown in the drawings, numeral 1 refers to a support structure which may have legs and horizontal members for supporting other portions of the apparatus. A stand 2 is mounted on support 1 by bolts 3 and nuts 4 which upon relative rotation fix stand 2 in predetermined vertical position. Resting on stand 2 is a relatively heavy vibrator 5 having a platform 6 which is capable of rapid vibration at desired high frequencies. This may be any standard electric vibrator commercially available.

Figures 5 and 6 show a wire tray 7 having spaced compartments 8 formed from wire cross-members to snugly accommodate twenty-four jars or bottles 9. Preferably as shown, Figure 4, the jars or bottles 9 have broad midsections slightly larger than the compartments 8. Upon placement in the tray, the jars or bottles are held suspended with their bottoms resting on the bottom of the tray.

Two vertical telescopic legs 10 are affixed in the corners of one side of the base support structure 1 with hinges 12a on their upper ends. A rectangular table 11 is mounted at the center of its sides on the hinges with a section to the right of its center (as shown in Figure 4) suspended over the tray 7. The table has a bottom with small upwardly extending lips forming side and end walls around its periphery.

The sections of the table meeting at the line athwart the hinge mountings 11a are a filling section 12 suspended over the base support 1 and a loading section 13 suspended away therefrom. There is no dividing wall between the sections, but the table is constructed with the sections pitched with respect to each other and subtending at an angle of about 150 degrees so that upon pivoting movement of the table one section is in a tilted position when the other is horizontally disposed.

The table 11 is hingedly mounted for only limited pivotal movement. Lugs (not shown) in the hinges 12a themselves prevent counter-clockwise motion of the table beyond the point (hereinafter called the "loading position") where the loading section 13 lies in a horizontal plane and where the filling section 12 is tilted and spaced upwardly away from the tray of bottles. See Figure 3, broken lines. The hinges also offer support in this position so that weights may be placed upon the loading section of the table. Clockwise rotation of the table to the point (hereinafter called the "filling position") wherein the filling section 12 of the table is horizontally disposed closely adjacent the tray of bottles is limited by two vertical bolt support legs 14 which are affixed to base support stand 1—their upper ends abutting against a lip 15 provided on the end edge of the filling section 12 of the table. When the table is in filling position these legs 14 also offer support for filling section 12 so that the latter can be loaded with weight. (See solid lines, Figure 3.)

The bottom of the loading section 13 of the table is flat and solid throughout. The bottom of the filling section 12 is flat but has a plurality of orifices 16, twenty-four as shown, for passage of fruit articles. These are spaced from one another in the same relation as the compartments 8 of the tray 7. See Figure 1. The orifices 16 are preferably circular in shape and preferably have a diameter slightly smaller than the openings of the bottles to be filled. In order to avoid stoppages or mis-filling, the orifices should not have a diameter greater than the diameter of the jar opening plus one-half of the diameter of the fruit article to be filled. Conversely, too small an opening will lower production. Surrounding at least one of the orifices, preferably two, on the underside of the filling section 12 is a downwardly extending collar 17 having a diameter slightly larger than the neck of the bottle to snugly accommodate same.

In operation of the apparatus, the table 11 is first tilted to loading position (see broken lines, Figure 3). This moves the filling section 12 of the table away from the vibrator 5 clearing a large passage for placement of the bottles on the vibrator. The jars or bottles to be filled are placed in the tray 7 and the tray is placed on the platform 6 of the vibrator 5. The height of telescopic legs 10 is then adjusted and fixed by set-screws 18, and the vertical height of vertical support legs 14 is adjusted and fixed by nuts 19, and the horizontal position of the tray 7 is adjusted, so that when the table is tilted to filling position (solid lines Figure 3) the collar 17 will enclose the necks of two of the bottles. This is accomplished by tilting the table one or two times while the adjustments are made, and automatically positions all of the orifices 16 over the openings in the bottles, i.e. orients the tray.

The table is then put in loading position, and the operator removes a large mass of the fruit, for example cherries, from the receptacle or barrel in which they have been stored and places them on the horizontally disposed loading section 13 of the table. This exposes all of the cherries for visual examination and the blemished or otherwise objectionable cherries are easily removed. The operator next tilts the table to filling position by clockwise movement to bring the filling section closely adjacent the jars. The collars 17 enclose the bottle necks thereby locking the tray in position. The vibrator is then turned on, causing the bottles to vibrate. Tilting of the table causes the cherries to roll onto and over the filling section 12, many of them dropping directly through orifices 16 into the bottles where they are settled uniformly by the vibration. The operator lightly brushes the remainder, rolling them on the filling section, until all have dropped through the orifices into the bottles or until all of the bottles are filled. The collars 17 hold the tray continuously oriented during filling despite the vibration, and this plus the vibration, causes the jars to be uniformly filled. By adjustment of the vertical height of the various parts, discussed above, so that the necks of the bottles are just below the bottom of the filling section 12, the point at which each bottle is completely filled with cherries is subject to easy determination by visual inspection. The vibrator is then deactuated. The table is next tilted back to loading position. This removes the collars from the necks of the bottles and the tray is released thereby. The tray of filled bottles now can be removed for syruping and capping. A new tray of empty bottles is then placed on platform 6 and the operation is repeated, it being understood that no vertical adjustment of the parts is necessary if the new bottles are of the same size as the old.

With this apparatus, I have been able to fill delicate fruit articles simultaneously into a large number of bottles with great speed, with a sanitary, highly accurate and uniform pack in each bottle. Non-uniformity in the pack caused by the individual working habits of workers or by the variation in working attitude from day to day of any one worker has been obviated.

As an example of the increased production obtained with the present invention, I have found that two workers using the present apparatus for packing cherries average about 22,000 eight ounce jars or 900 cases per eight hour working day. This is to be compared with the production of only 2,800 eight ounce jars or 120 cases which is the eight hour average for two workers with prior methods involving counting or other means providing uniformity of pack.

The angle subtended by the loading section 13 and filling section 12 of the table 11 discussed above is not critical. The angle must be large enough so that the fruit on the loading section will roll onto the filling section under the force of gravity or with light brushing when the table is tilted to filling position. Conversely, the angle must be small enough so that the fruit will not roll with such force that they fly off the filling section 12 but instead are contained by the side and end walls of the filling section. Hereinafter, sections subtending such an angle will be referred to as pitched sections.

Since the invention may be practiced with slight departures from the preferred embodiment illustrated and described above, it should be understood that variation from the details thereof is not without the scope of the invention unless so expressed in the claims appended hereto.

I claim:

1. An apparatus for filling fruit articles into jars comprising a base support, a vibrator carried by the base support, a tray having spaced compartments for holding the jars and resting on said vibrator for vibration movement thereby, a table mounted on said base support having a filling section on one side of its center and a loading section on the other side thereof and said sections being pitched, the loading section of said table being solid and the filling section having a plurality of orifices spaced from each other in the same relation as the compartments of the tray for passage of fruit articles, said table being pivotally mounted with the filling section above said tray for limited movement from loading position with said filling section spaced from said tray to and from filling position with said filling section horizontally disposed closely adjacent said tray, and means to hold said tray with its compartments oriented to the orifices when said table is in filling position.

2. The subject matter of claim 1 characterized by the fact that the holding means consists of at least one downwardly extending collar surrounding an orifice on the underside of the filling section and having a diameter large enough to snugly accommodate the neck of a jar.

References Cited in the file of this patent

UNITED STATES PATENTS

| | | |
|---|---|---|
| 469,992 | Cox | Mar. 1, 1892 |
| 507,870 | Young | Oct. 31, 1893 |
| 751,257 | Carnochan | Feb. 2, 1904 |
| 2,155,336 | Smith | Apr. 18, 1939 |